United States Patent
Kim et al.

(10) Patent No.: US 8,060,165 B2
(45) Date of Patent: Nov. 15, 2011

(54) PORTABLE TERMINAL

(75) Inventors: Min-Soo Kim, Seoul (KR);
Chang-Yong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 12/242,385

(22) Filed: Sep. 30, 2008

(65) Prior Publication Data

US 2009/0286574 A1 Nov. 19, 2009

(30) Foreign Application Priority Data

May 14, 2008 (KR) .................. 10-2008-0044745

(51) Int. Cl.
*H04B 1/03* (2006.01)
*H04B 1/38* (2006.01)
*H04M 1/02* (2006.01)
*H04M 1/00* (2006.01)
*H04M 1/03* (2006.01)

(52) U.S. Cl. .................. 455/575.4; 455/566; 455/575.1; 455/575.3; 455/90.3; 455/128; 348/14.07; 348/376

(58) Field of Classification Search .................. 455/566, 455/347–349, 575.1–575.9, 90.1–90.3, 128; 16/221–252, 266, 274, 277, 284–297, 302–304, 16/319–342, 349–353, 366, 367; 348/14.02–14.03, 348/373–376; 345/905, 173

See application file for complete search history.

(56) References Cited

U.S. PATENT DOCUMENTS

| | | | |
|---|---|---|---|
| 2005/0096082 | A1 | 5/2005 | Chang |
| 2006/0053847 | A1* | 3/2006 | Taki et al. ........................ 70/247 |
| 2006/0128449 | A1 | 6/2006 | Park |
| 2006/0160584 | A1* | 7/2006 | Lee et al. .................... 455/575.4 |
| 2007/0197270 | A1* | 8/2007 | Kim .......................... 455/575.4 |
| 2007/0243731 | A1* | 10/2007 | Im ................................. 439/131 |
| 2007/0243896 | A1* | 10/2007 | Maatta et al. .............. 455/550.1 |
| 2007/0252202 | A1* | 11/2007 | Park et al. ...................... 257/335 |
| 2009/0170573 | A1* | 7/2009 | Harmon et al. ............ 455/575.4 |
| 2009/0170574 | A1* | 7/2009 | Harmon et al. ............ 455/575.4 |
| 2009/0227301 | A1* | 9/2009 | Lindvall ..................... 455/575.4 |

FOREIGN PATENT DOCUMENTS

| | | |
|---|---|---|
| CN | 1984158 A | 6/2007 |
| EP | 1796351 A1 | 6/2007 |
| WO | WO-2008/004786 A1 | 1/2008 |
| WO | WO-2008/082080 A1 | 7/2008 |

* cited by examiner

*Primary Examiner* — Ajit Patel
*Assistant Examiner* — Erica Navar
(74) *Attorney, Agent, or Firm* — Birch, Stewart, Kolasch & Birch, LLP

(57) ABSTRACT

A portable terminal is provided where the portable terminal includes a lower body, an upper body connected to the lower body, the upper body being slidably moveable in a first direction with respect to the lower body between a closed position and an open position, and a first moving unit connected between the upper body and the lower body to move the upper body in a second direction different from the first direction. The first moving unit is configured to move the upper body toward the lower body along the second direction when the upper body is moved from the closed position to the open position and to move the upper body away from the lower body along the second direction when the upper body is moved from the open position to the closed position.

17 Claims, 11 Drawing Sheets

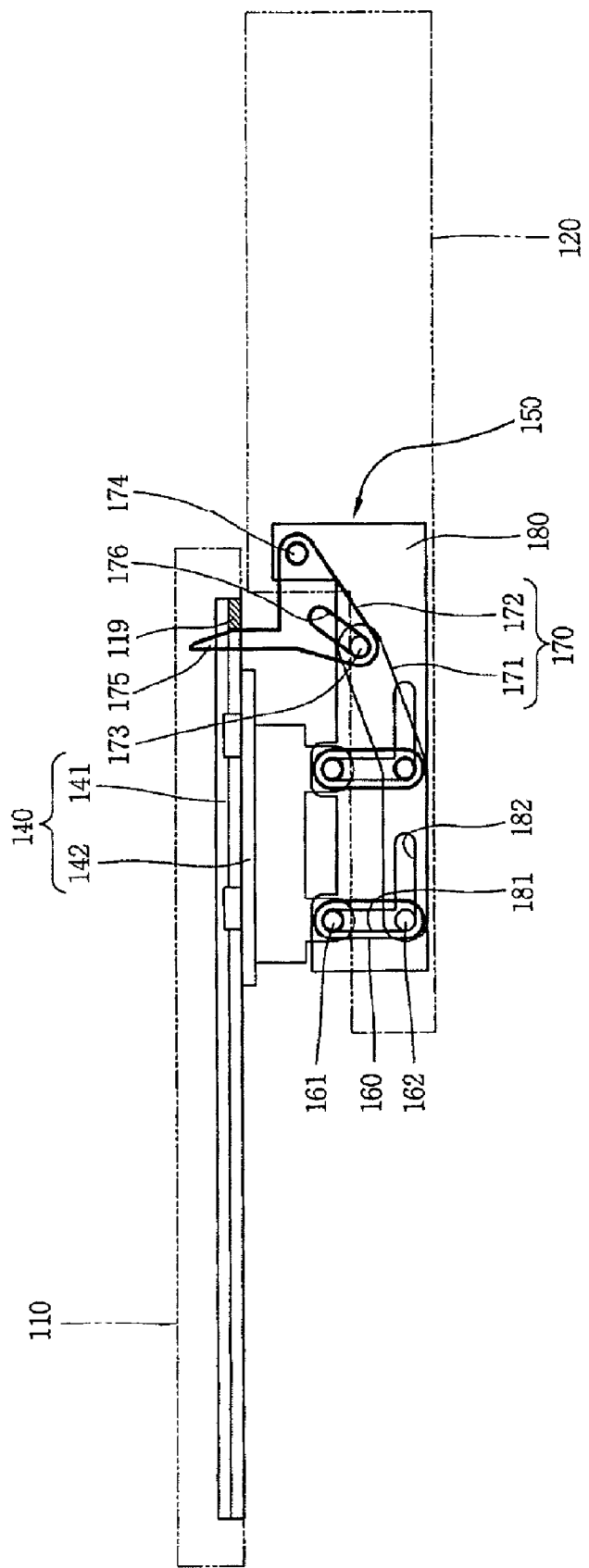

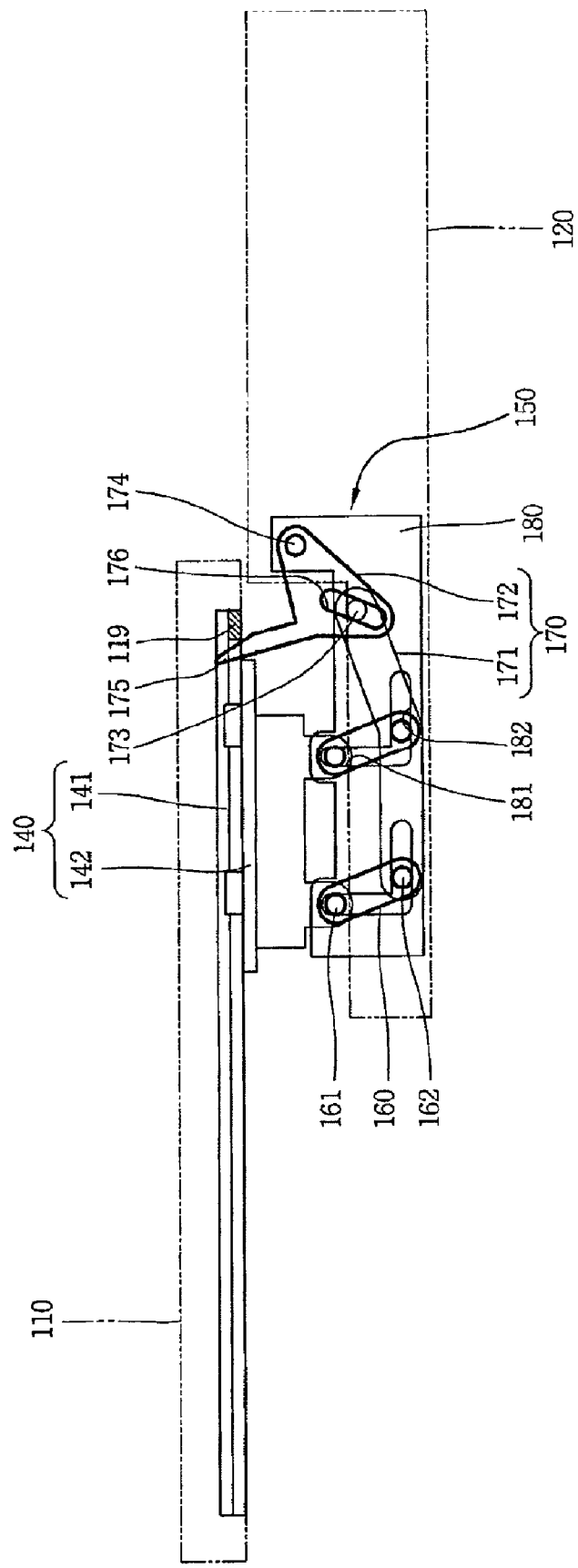

PORTABLE TERMINAL

CROSS-REFERENCE TO RELATED APPLICATIONS

The present application claims priority to Korean Application No. 10-2008-0044745, filed on May 14, 2008, and is incorporated by reference in its entirety.

BACKGROUND OF THE INVENTION

1. Field of the Invention

The present invention relates to a portable terminal having an upper body and a lower body slidably coupled to each other, and more particularly, to a portable terminal having a first moving unit configured to move an upper body of the portable terminal with respect to a lower body of the portable terminal.

2. Description of Related Art

Generally, a portable terminal serves as a portable device providing one or more functions such as voice and video calls, information input/output, and data storage. Because portable terminals now provide many additional services besides basic call services, a user can capture photos or moving images, reproduce music or video, play games, receive broadcasting programs, and the like. As such, portable terminals are becoming multimedia players.

In order to implement complicated functions of the multimedia player, various improvements are being provided in the hardware or software implementation of the portable terminal. For instance, a user interface is provided to allow a user to easily and conveniently search or select functions of the portable terminal.

Furthermore, because the portable terminal is currently regarded as expressing a person's personality or taste, various designs such as a bar type, a slide type, a folder type, and a swivel type are being developed.

Recently, various attempts to provide not only the above structure but also a more convenient to operate user are being pursued.

BRIEF SUMMARY OF THE INVENTION

Therefore, it is an object of the present invention to provide a slide type portable terminal capable of minimizing a step occurring between an upper body and a lower body, and capable of vertically moving the upper body with respect to the lower body between a closed position and an open configuration.

To achieve these and other advantages and in accordance with the purpose of the present invention, as embodied and broadly described herein, there is provided a portable terminal having a lower body, an upper body connected to the lower body, the upper body being slidably moveable in a first direction with respect to the lower body between a closed position and an open position, and a first moving unit connected between the upper body and the lower body to move the upper body in a second direction different from the first direction. The first moving unit is configured to move the upper body toward the lower body along the second direction when the upper body is moved from the closed position to the open position and to move the upper body away from the lower body along the second direction when the upper body is moved from the open position to the closed position. The first moving unit includes a link member connecting the upper body to the lower body, the link member having a first end connected to the upper body at a first connecting point, and a linkage operator connected to the link member such that the first connection point is moved toward the lower body when the upper body is moved from the closed position to the open position and the first connecting point is moved away from the lower body when the upper body is moved from the open position to the closed position.

In accordance with another aspect of the present invention, a portable terminal is provided where the portable terminal includes an upper body, a lower body connected to the upper body, the upper body being slidably moveable in a first direction with respect to the lower body between a closed position and an open position, a first moving unit connected between the upper body and the lower body to move the upper body in a second direction different from the first direction. The first moving unit is configured to move the upper body toward the lower body along the second direction when the upper body is moved from the closed position to the open position and to move the upper body away from the lower body along the second direction when the upper body is moved from the open position to the closed position. The portable terminal also includes a first display located at the upper body, and a second display located at the lower body. The second display is exposed when the upper body moves from the closed position to the open position, and the first and second displays are substantially co-planar when the upper body is in the open position.

The foregoing and other objects, features, aspects and advantages of the present invention will become more apparent from the following detailed description of the present invention when taken in conjunction with the accompanying drawings.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 5A to 5D are sectional views of the portable terminal, which show a structure and operation of the first moving unit;

DETAILED DESCRIPTION OF THE INVENTION

Reference will now be made in detail to a portable terminal according to a first exemplary embodiment of the present invention and will be explained in more detail with reference to the attached drawings.

Figure 1A:
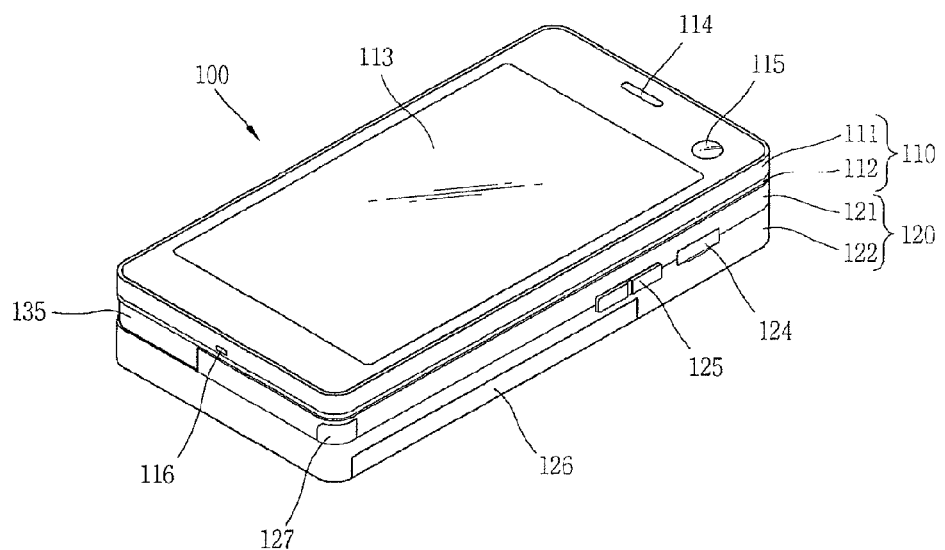
FIGS. 1A and 1B are front perspective views of a portable terminal in an closed position and an open position, respectively, according to a first exemplary embodiment of the present invention.
Figure 1B:
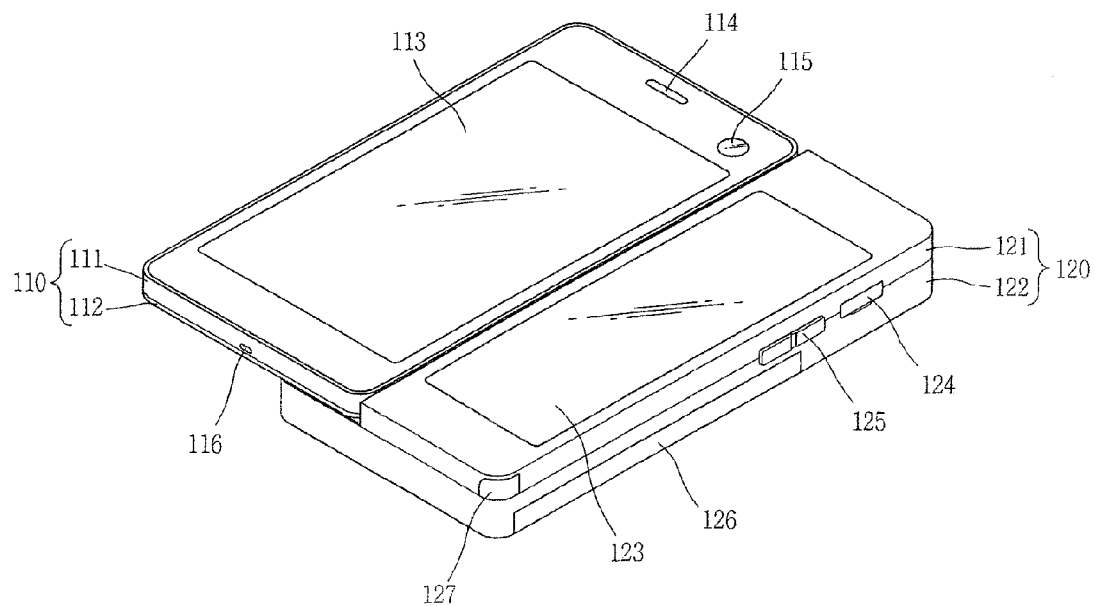

FIGS. 1A and 1B are front perspective views of a portable terminal 100 according to a first exemplary embodiment of the present invention. The portable terminal 100 includes an upper body 110 and a lower body 120 coupled to the upper body 110 so as to be slidable in one or more directions. As shown in FIG. 1A, when the portable terminal is in a closed position, the upper body 110 overlaps the lower body 120. As shown in FIG. 1B, when the upper body 110 is in an open position, the upper body 110 exposes at least one part of the lower body 120. The upper body 110 is coupled to the lower body 120 so as to be slidably movable in a width direction (lateral direction) of the lower body 120, and is configured to move up and down with respect to the lower body 120. When the portable terminal is in an open configuration, the upper body 110 and the lower body 120 may be disposed on the same plane such that the upper surfaces of both bodies 110, 120 are substantially co-planar.

The portable terminal 100 may be operated in a standby mode when in a closed configuration. However, the standby mode may be released by a user's manipulation. Also, the portable terminal 100 may be operated in a call mode, or other modes, in an open configuration. However, the call mode may be converted to the standby mode by a user's manipulation or after a certain time has elapsed without active use of the portable terminal 100. It is understood that the portable terminal 100 could be configured to provide different modes depending on the state of the portable terminal 100, such as the portable terminal being able to operate in call mode when the portable terminal 100 is in the closed position.

The upper body 110 includes a case having a front case 111 and a rear case 112. Various electronic components of the portable terminal 100 are mounted in a space formed between the front case 111 and the rear case 112. The cases 111 and 112 may be formed of injection-molding synthetic resins or a metallic material, such as stainless steel (STS) or titanium (Ti).

A first display unit 113, a first audio output unit 114, a first image input unit 115, an audio input unit 116, and so on may be disposed at the upper body 110 of the portable terminal 100, preferably, at the front case 111. The display unit 113 may include a liquid crystal display (LCD) module, an organic light emitting diodes (OLED) module, or other suitable displays. The display unit 13 may also include a touch screen or touch pad to allow a user to input information in a touch manner. The first audio output unit 114 may be a receiver or a speaker, and the first image input unit 115 may be a camera module to capture still or moving images by a user. The audio input unit 116 may be a microphone so as to input a user's voice or other sounds.

Similar to the upper body 110, the lower body 120 includes a front case 121 and a rear case 122. A second display unit 123 is disposed at the lower body 120, preferably, at a front surface of the front case 121. Similar to the first display unit 113, the second display unit 123 outputs visual information, and may be implemented as a touch screen for inputting information. The second display 123 is exposed when the upper body moves from a closed position to the open position.

On at least one of the front case 121 and the rear case 122, a manipulation unit 124, an interface 125, and other components may be disposed. The manipulation unit 124 receives a command to control operation of the portable terminal by a user's manipulation, and any type of manipulation unit may be adopted so long as it is manipulable by a user in a tactile manner. For example, the manipulation unit 124 may include a dome switch, a touch screen, or a touchpad configured to receive information or command by a user in a push or touch manner. Also, the manipulation unit 124 may be a wheel, a jog switch, or a joy stick.

The interface 125 provides a means through which the portable terminal of the present invention can exchange data with external devices. For instance, the interface 125 may include at least one of a connection terminal to be connected to an earphone by wire or by radio, a short-range communication port (e.g., IrDA port, BLUETOOTH port, wireless LAN port, and so on). The interface 125 may be configured as a card socket (e.g., for receiving an external card such as a memory card to store information), a subscriber identity module (SIM) card, or a user identity module (UIM) card. In addition, the interface may be configured to cooperate with a power supply terminal for supplying power to the portable terminal 100.

A power supply unit 126 for supplying power to the portable terminal is located at the rear case 122 of the lower body 120. The power supply unit 126 may be a chargeable battery, and may be detachably coupled to the rear case 122 for charging.

A broadcasting signal receiving antenna 127 may be disposed at one side of the rear case 122. The antenna 127 may be installed at the lower body 120 so as to be drawn out from the lower body 120.

Figure 2:
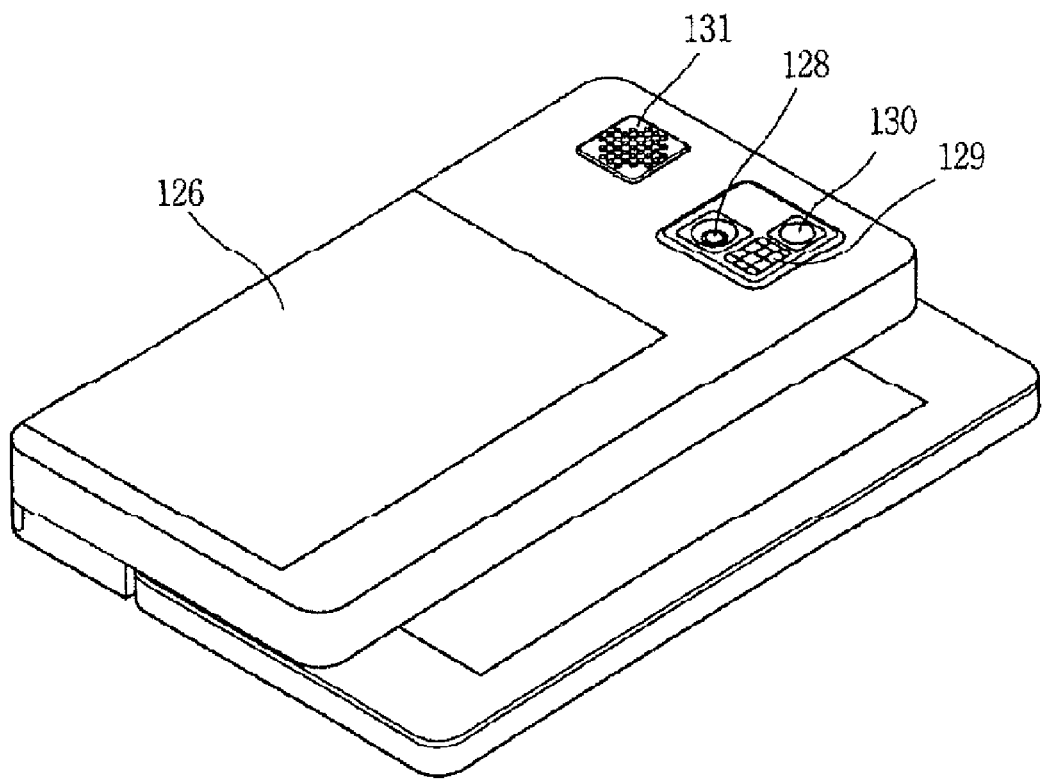
FIG. 2 is a rear perspective view of the portable terminal of FIGS. 1A and 1B.

FIG. 2 is a rear perspective view of the portable terminal of FIGS. 1A and 1B. As shown in FIG. 2, a second image input unit 128 is mounted to a rear surface of the rear case 122 of the lower body 120. The second image input unit 128 has a capturing direction opposite to that of the first image input unit 115 (refer to FIGS. 1A and 1B), and may be a camera having different pixels from the first image input unit 115. For instance, the first image input unit 115 preferably has a low number of pixels so that a user's face captured during a video call can be immediately transmitted to another party, while the second image input unit 128 preferably has a high number of pixels to capture still or moving images that are intended to be stored and shared at a later time.

A flash 129 and a mirror 130 are disposed adjacent to the second image input unit 128. When an object is captured by the second image input unit 128, the flash 129 emits light toward the object. When a user wants to capture himself or herself by using the second image input unit 128, the mirror 130 serves to reflect the user's face.

A second audio output unit 131 is located at the rear case 122. The second audio output unit 131 may provide a stereo function in conjunction with the first audio output unit 114 (refer to FIG. 1), and may be used for calls in a speaker phone mode.

While various features of the portable terminal 100 have been described as being located on either the upper body 110 or lower body 120, it is possible for one or more of these features to be located in a different position. For example, at least one of the components 128 to 132 explained to be disposed at the rear case 122 may be mounted to the upper body 110, in particular, to the rear case 112. In this case, components disposed at the rear case 112 can be protected by the lower body 120 in a closed configuration. Furthermore, even when the second image input unit 128 is not provided, the first image input unit 115 may be configured to be rotatable so that it can capture not only objects in its capturing direction, but also capturing objects in a direction that would otherwise be covered by the second image input unit 128.

Figure 3:
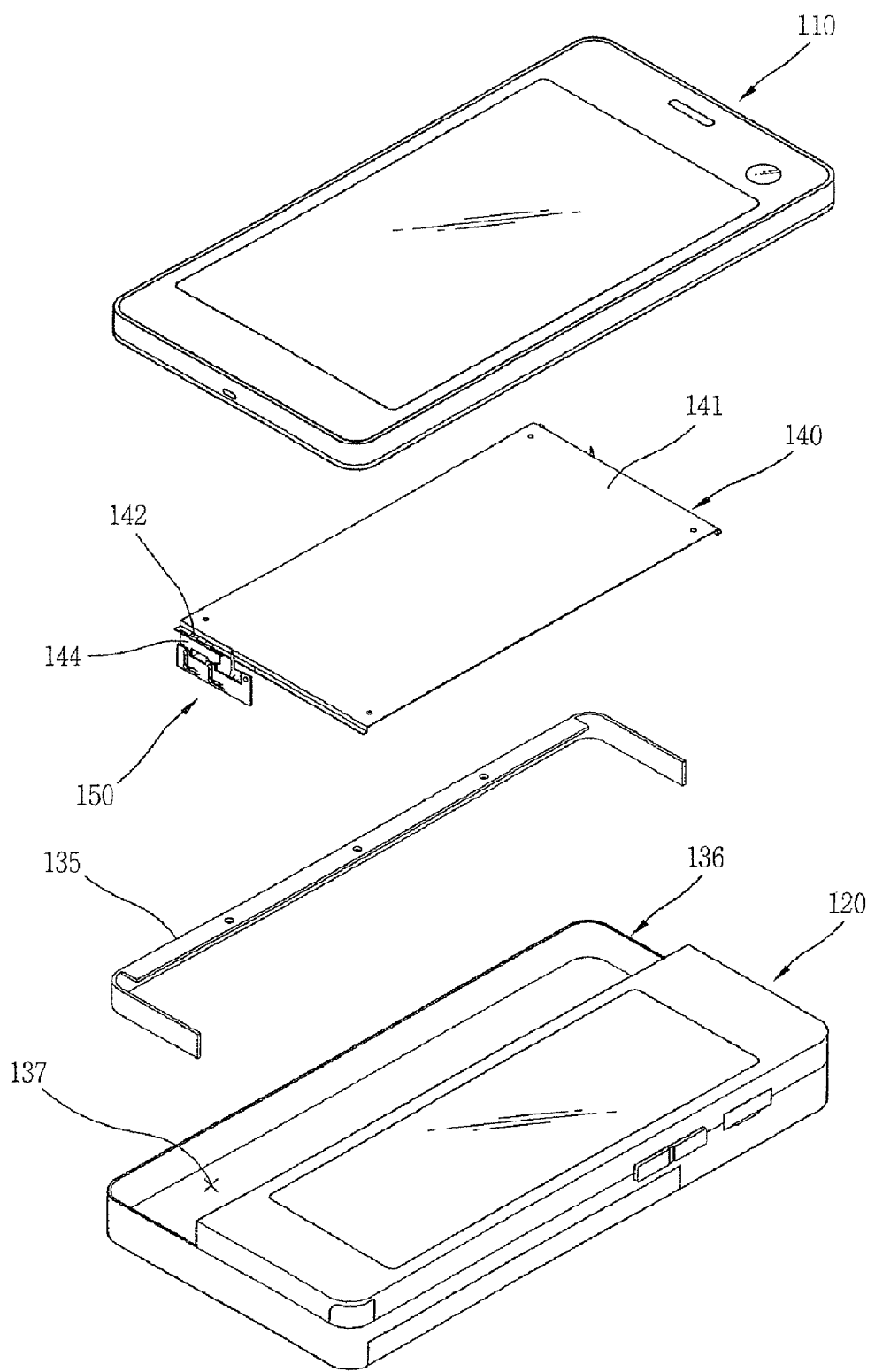
FIG. 3 is an exploded perspective view of the portable terminal of FIGS. 1A and 1B.
Figure 4:
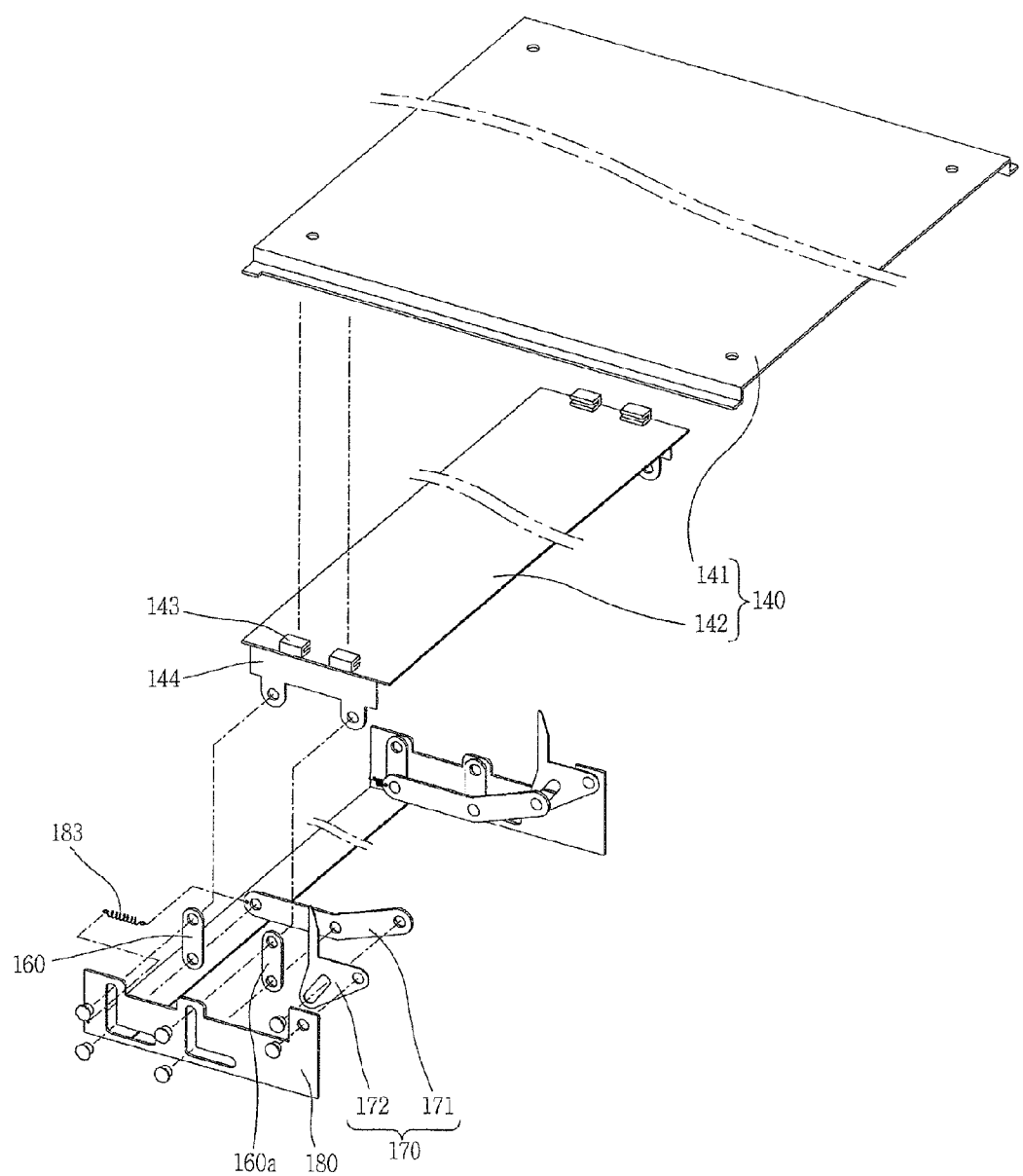
FIG. 4 is an exploded perspective view of a slide module and a first moving unit of FIG. 3.

FIG. 3 is an exploded perspective view of the portable terminal of FIGS. 1A and 1B, and FIG. 4 is an exploded perspective view of a slide module and a first moving unit of FIG. 3. As shown in FIG. 3, the portable terminal 100 includes a slide module 140 configured to slidably couple the upper body 110 to the lower body 120, and a first moving unit 150 between the upper body 110 and the lower body 120. The first moving unit is configured to move the upper body 110 in an up and down direction when the upper body 110 is moved between the closed position and the open position.

The slide module 140 includes an upper slide member 141, a lower slide member 142 slidably coupled to the upper slide member 141, and a slide groove 143 connecting the upper slide member 141 to the lower slide member 142. As shown in FIG. 3, the upper slide member 141 may have a plate shape and is fixed to the upper body 110. The upper slide member 141 is inserted into the slide grooves 143, which are located at a side surface of the lower slide member 142. An elastic force supply unit (not shown) connected between the upper slide member 141 and the lower slide member 142 to provide an elastic force to the upper and lower slide members 141 and 142 when the upper and lower slide members 141 and 142 are slid with respect to each other. The elastic force supply unit may be implemented by using an elastic force that occurs when a spring is compressed and restored. For instance, the elastic force supply unit may include a spring that generates an elastic force when compressed and is restored by passing through a dead point as the upper and lower slide members 141 and 142 move with respect to each other in a predetermined region.

The first moving unit 150 is configured to move the upper body 110 with respect to the lower body 120 in an up and down direction when the upper body 110 is moved between a closed and an open position. The first moving unit 150 is connected to a lower part of the slide module 140. The first moving unit 150 is configured to cause the slide module 140 to be moved in an up and down direction. As the slide module 140 is moved in an up and down direction, the upper body 110 fixed to the upper slide member 141 is also moved in an up and down direction. A second moving unit similar to the first moving unit may be provided at an end of the portable terminal opposite the first moving unit 150. Because the second moving unit is similar to the first moving unit, the following description will be with reference to the first moving unit.

The lower body 120 includes a recess portion 136 serving as a lowering space for the upper body 110. The recess portion 136 may be formed as a depression with respect to an upper surface of the lower body 120. A mounting recess 137 for partially mounting the first moving unit 150 is formed on the recess portion 136. Details of the first moving unit will be described below with reference to FIGS. 3, 4, and 5A to 5D.

The first moving unit 150 includes a link member 160 configured to connect the upper body 110 to the lower body 120, and a link operator 170 configured to operate the link member 160. The link member 160 is connected to the slide module 140, more particularly, to the lower slide member 142 via a wing portion 144 formed at the lower slide member 142. The wing portion 144 may extend from a side surface of the lower slide member 142 toward the first moving unit 150.

A second link member 160a is mounted to the wing portion 144 of the lower slide member 142. The first and second link members 160 and 160a are connected to the lower slide member 142 so as to maintain a horizontal state of the upper body 110 when the upper body 110 is lifted. The first and second link members 160 and 160a have the same configuration, operation, and components connected thereto. Accordingly, the first and second link members 160 and 160a will be referred to as the link member 160. One end of the link member 160 is rotatably connected to the wing portion 144 by a first connecting point 161.

A link operator 170 is provided that causes the first connecting point 161 to be moved in an up and down direction when the upper body 110 is moved between a closed and open position. In particular, the link operator 170 connects the wing portion 144 of the lower slide member 142 to the link member 160 and causes the first connecting point 161 to move in a direction perpendicular to a slide direction. That is, the link operator 170 serves to move the first connecting point 161 in a vertical path.

The link operator 170 includes a first operation member 171 connected to the link member 160, and a second operation member 172 configured to operate the first operation member 171 when the upper body 110 is slid with respect to the lower body 120. The first operation member 171 causes the first connecting point 161 to move in an up and down direction.

The first operation member 171 is pivotally connected to the link member 160, thereby allowing the link member 160 to rotate. In particular, the link member 160 is connected to the first operation member 171 by a second connecting point 162 at an end of the link member 160 opposite the first connecting point 161. The first operation member 171 may be formed to have a bar shape having one curved region. The first and second connecting points 161 and 162 may be implemented as connection pins.

The second operation member 172 is pivotally connected to the first operation member 171, and is connected to the end of the first operation member 171 by a third connecting point 173. An operation protrusion 175 extends at one side of the second operation member 172. A push protrusion 119 is provided at lower surface of the upper body 110 to rotate the second operation member 172 by pushing the operation protrusion 175 when the upper body 110 performs a sliding motion.

A supporting frame 180 configured to support the link member 160, the first operation member 171, and the second operation member 172 is provided on the mounting recess 137 of the lower body 120. The supporting frame 180 includes a first slot portion 181 configured to guide a vertical motion of the first connecting point 161, and a second slot portion 182 extending from the first slot portion 181 toward one side. The second slot portion 182 serves to guide a motion of the second connecting point 162. As the first connecting point 161 vertically moves along the first slot portion 181, the second connecting point 162 moves along the second slot portion 182. That is, the second slot portion 182 serves to guide the second connecting point 162 to move toward an interior of the lower body 120. The second slot portion 182 may have a length direction perpendicular to a length direction of the first slot portion 181 or otherwise extend in a lateral direction of the portable terminal. As shown in this exemplary embodiment, the supporting frame 180 is a separate member; however, the supporting frame 180 may be integrally formed at the lower body 120.

The second operation member 172 is located on the supporting frame 180 so as to be pivotal around a rotation shaft 174 and is configured so as to move the first operation member 171 when pivoted. A third slot portion 176 configured to guide a linear motion of the third connecting point 173 may be formed on the second operation member 172.

A spring 183 configured to supply a restoration force to lift up the upper body 110 may be installed between the supporting frame 180 and the first operation member 171. The spring 183 is mounted between one end of the first operation member 171 and the end of the supporting frame 180. The spring 183 is configured so as to be tensed when the first operation member 171 moves toward the interior of the lower body 120. In this exemplary embodiment, the spring 183 has an elastic force that is smaller than that of the elastic force supply unit of the slide module 140.

As shown in FIG. 4, and as noted above, the link member 160, the first operation member 171, and the second operation member 172 may be provided in duplicate at opposite sides of the portable terminal 100 via the supporting frame 180, and have the same configuration as described above.

As seen in FIGS. 1 to 3, a cover 135 for covering the first moving unit 150 in a closed configuration may be installed at an outer periphery of the recess portion 136. The cover 135 has a shape corresponding to an outer circumferential surface of the recess portion 136, and is mounted to a rear surface of the lower slide member 142 to move with the lower slide member 142. The cover 135 is configured to be inserted into the lower body 120 when the upper body 110 is lowered, and is configured to cover the first moving unit 150 by being exposed when the upper body 110 is lifted.

Because of the arrangement of the first moving unit 150, the upper body 110 is slidably moveable in a first direction with respect to the lower body 120 between the closed position and the open position, and the first moving unit 150 is connected between the upper body 110 and the lower body 120 to move the upper body 110 in a second direction different from the first direction. The first moving unit 150 is configured to move the upper body 110 toward the lower body 120 along the second direction when the upper body 110 is moved from the closed position to the open position and to move the upper body 120 away from the lower body 120 along the second direction when the upper body 110 is moved from the open position to the closed position. In particular, the first connecting point 161 is moved toward the lower body 120 when the upper body 110 is moved from the closed position to the open position and the first connecting point 161 is moved away from the lower body 120 when the upper body 110 is moved from the open position to the closed position. The sequential operation of the first moving unit 150 will be described in greater detail below with reference to FIGS. 5A to 5D.

Figure 5A:
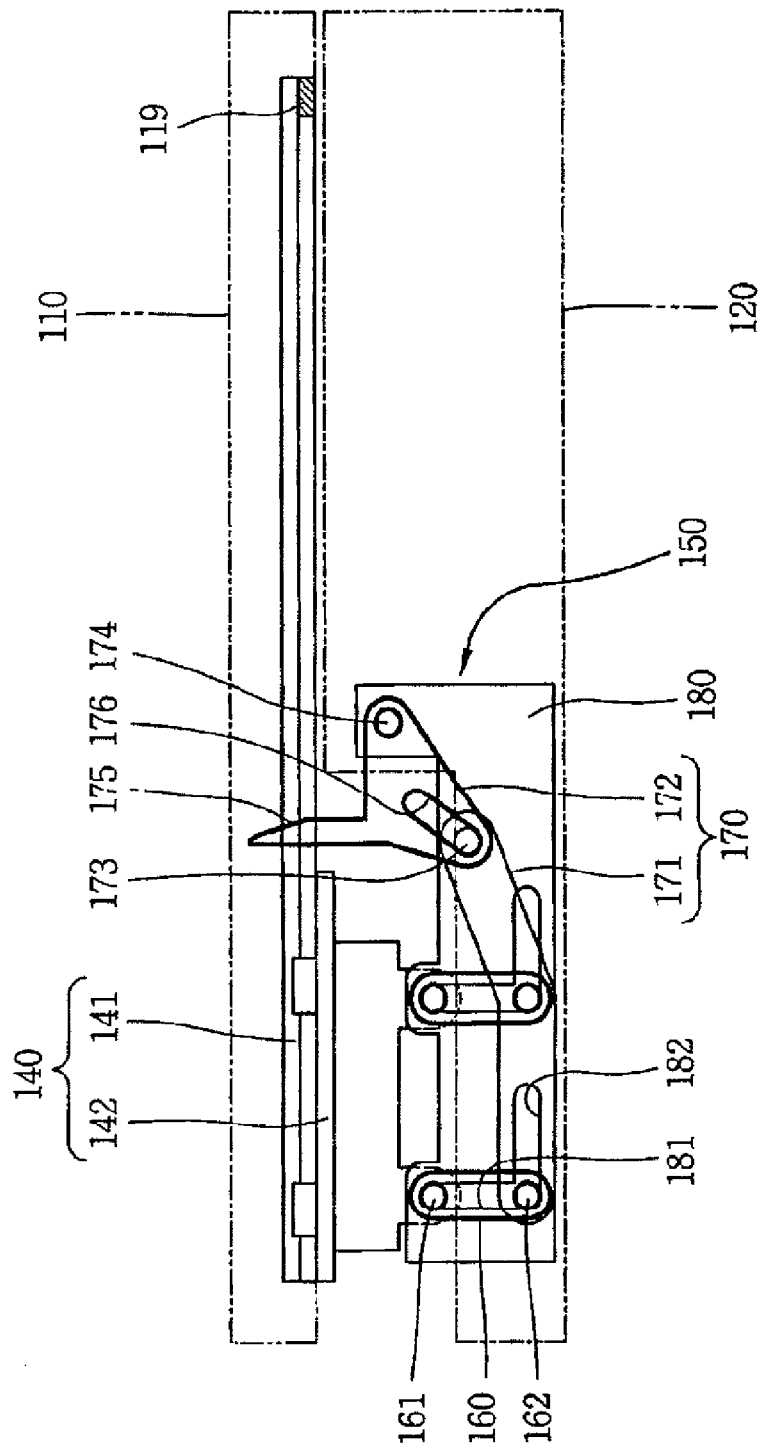

FIG. 5A shows the portable terminal 100 in a closed configuration. In the state shown in FIG. 5A, when a user applies a force to the upper body 110 or the lower body 120, the upper and lower bodies 110 and 120 move relative each other. Here, the upper slide member 141 performs a sliding motion on the lower slide member 142. Under this state, once the user moves the upper body 110 to a dead point of the elastic force supply unit, the upper body 110 automatically moves toward the open position by an elastic force of the elastic force supply unit.

As shown in FIG. 5B, once the push protrusion 119 of the upper body 110 reaches the recess portion 136 of the lower body 120, the push protrusion 119 pushes the operation protrusion 175 of the second operation member 172, thereby applying a pivoting force to the second operation member 172.

As shown in FIG. 5C, as the second operation member 172 is pivoted, the first operation member 171 is linearly moved toward the interior of the lower body 120. Under this state, the first operation member 171 pivots the link member 160, thereby causing the first to third connecting points 161, 162, and 173 to move linearly on the first to third slot portions 181, 182, and 176, respectively.

Figure 5D:
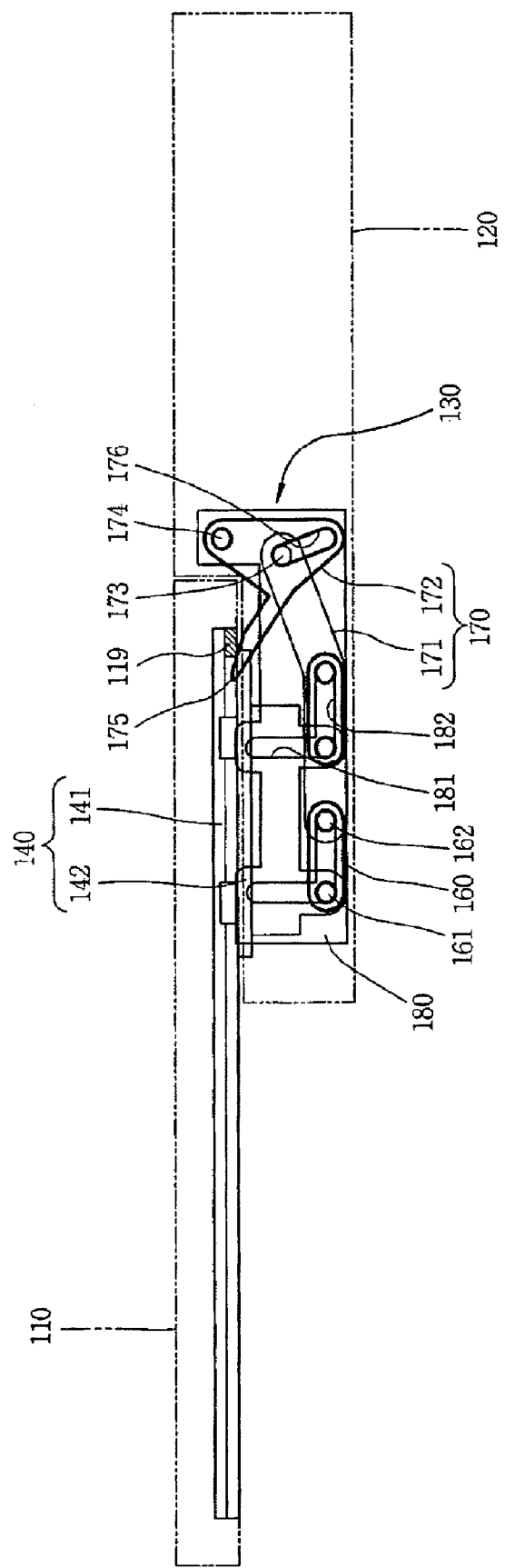

As the first connecting point 161 is lowered in a vertical direction, the slide module 140 is lowered. FIG. 5D shows an open configuration, in which the upper body 110 is completely lowered as the link member 160 has been displaced in the vertical direction. Accordingly, the upper body 110 is lowered with a moving path in a direction perpendicular to the sliding direction. In this exemplary embodiment, because the elastic force from the elastic force supply unit is greater than the elastic spring force of the spring 183, the upper body 110 is maintained in the lowered position.

To move the upper body 110 from the open position, as shown in FIG. 5D, the process is repeated in reverse order. In particular, a user applies a force to the upper body 110 in an upward direction, thereby causing the upper body 110 to be lifted. In this manner, the spring 183 provides a restoration force to lift the upper body 110. When the user applies a force to the upper body 110 toward a closed position after the upper body 110 is completely lifted, the upper and lower bodies 110 and 120 perform a relative sliding motion into the closed position.

Figure 6A:
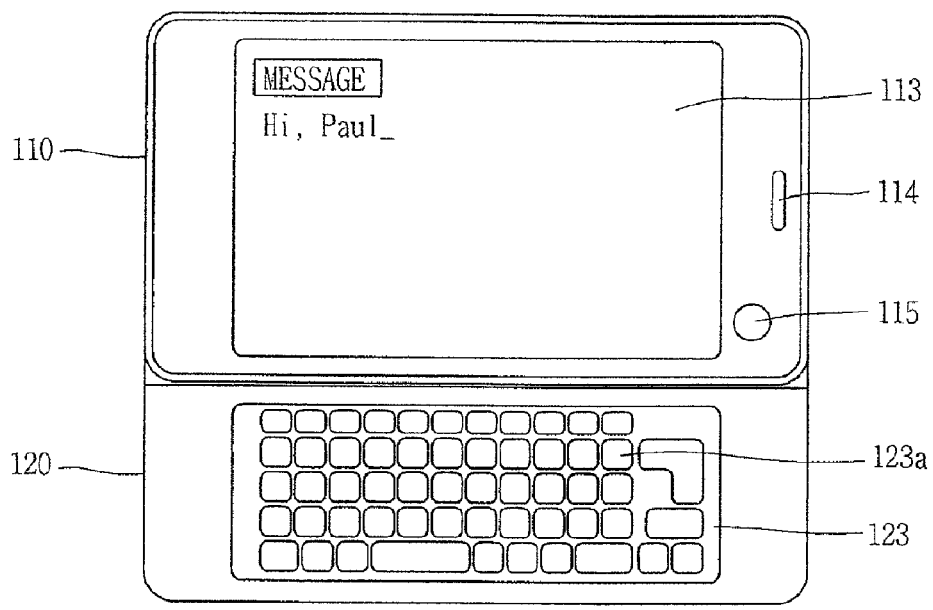
FIGS. 6A to 6C are plan views of the portable terminal, which shows various operation states of the portable terminal.
Figure 6B:
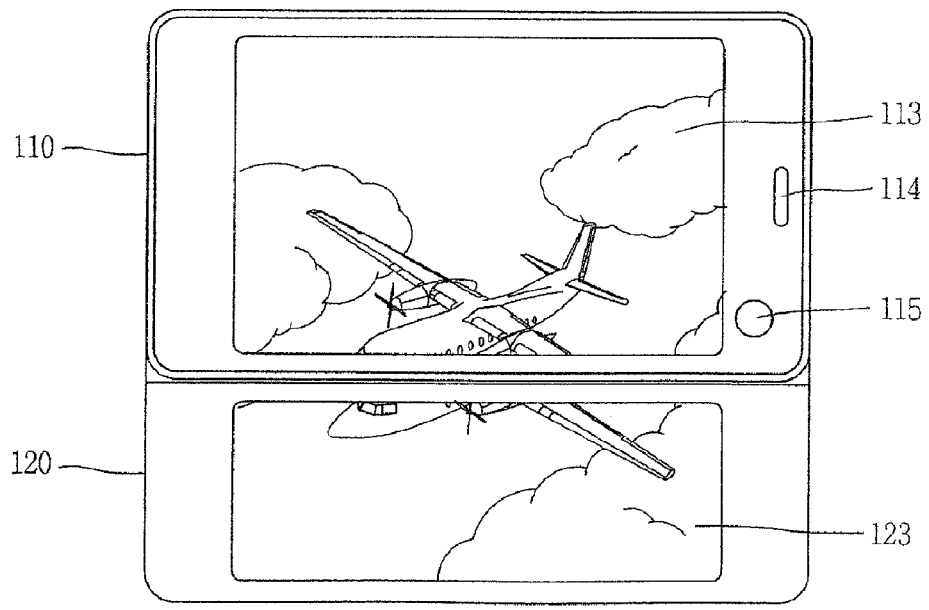
Figure 6C:
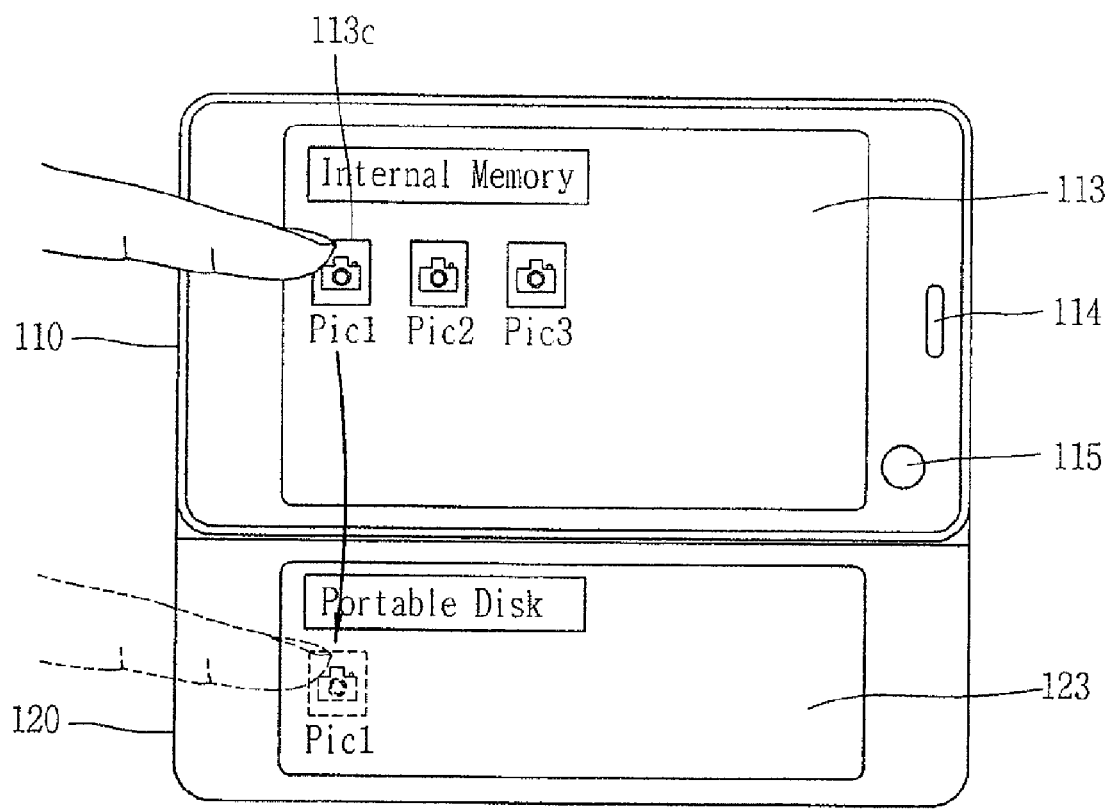

FIGS. 6A to 6C are plan views of the portable terminal 100, which show various operation states of the portable terminal 100. In a closed configuration, the portable terminal may be used in a similar manner to a bar type portable terminal. For instance, when the first display 113 is implemented as a touch screen, telephone numbers, text messages, and so on may be inputted through the first display unit 113, and a call, or transmission or reception of text messages, and so on may be performed.

When the portable terminal is converted to an open configuration from a closed configuration, additional functions (e.g., multimedia functions) may be operated. To this end, the second display unit 123 is activated to assist with the use of the additional functions. For example, as shown in FIG. 6A, the portable terminal 100 can be used in the open position to assist in typing messages using the second display unit 123. The second display unit 123 can be a touch screen that displays a QWERTY type of keyboard 123a. When a user touches the keyboard 123a, corresponding information is output to the first display unit 113 in the form of text.

As shown in FIG. 6B, the first and second displays 113 and 123 may be combined to provide the effect of a single screen, and may provide visual information on a larger screen to a user. In order to provide a more seamless screen, the upper and lower bodies 110 and 120 are preferably configured so that their upper surfaces are disposed on the same plane.

The first and second display units 113 and 123 may be configured to display visual information that can be usable with each other by a user's touch. FIG. 6C shows one example of the above configuration. As shown in FIG. 6C, icons 113c displayed on the first display unit 113 may be moved to the second display unit 123 in a touch and drag manner. Preferably, upper surfaces of the first and second bodies 110 and 120 are disposed on the same plane. A sensor configured to sense a user's touch may be disposed between the first and second display units 113 and 123.

Information relating to files stored in an internal memory of the portable terminal may be displayed on the first display unit 113. And, on the second display unit 123, information relating to an external memory detachably mounted to the portable terminal may be displayed. A user may move the icons 113c for files displayed on the first display unit 113 onto the second display unit 123 in a touch and drag manner, with the result that that files stored in the internal memory may be transmitted to the external memory.

Figure 7:
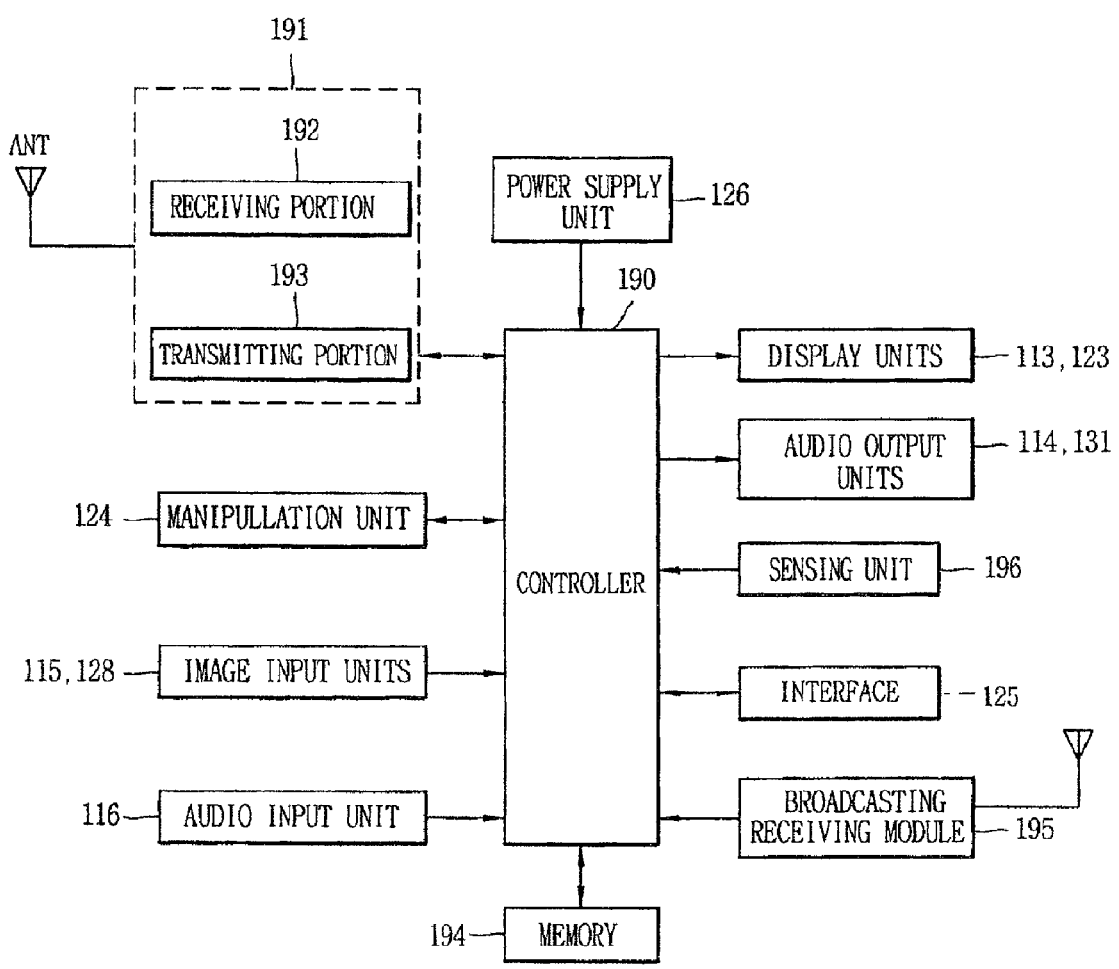
FIG. 7 is a block diagram of the portable terminal according to the first exemplary embodiment of the present invention.

FIG. 7 is a block diagram of the portable terminal according to the present invention. As seen in FIG. 7, the portable terminal 100 according to the first exemplary embodiment of the present invention includes a wireless communication module 191, a manipulation unit 124, image input units 115 and 128, an audio input unit 116, display units 113 and 123, audio output units 114 and 131, a sensing unit 196, an interface 125, a broadcasting receiving module 195, a memory 194, a power supply unit 126, and a controller 190. The controller 190 controls the entire operation of the portable terminal. For instance, the controller 190 performs control and processing relating to a voice call, data communication, a video call, and so on.

The wireless communication module 191 transmits or receives wireless signals to/from a base station through an antenna. For instance, the wireless communication module 191 includes a transmitting portion 193 configured to perform transmission of voice data, text data, image data, and control data under control of the controller 190, and to transmit signals after a modulation process. The wireless communication module 191 also includes a receiving portion 192 configured to demodulate received signals.

The manipulation unit 124 may have a configuration as shown in FIGS. 1A and 1B, and provides key input data inputted by a user to the controller 190 to control operation of the portable terminal. The manipulation unit 124 may be formed as a dome switch, a touch screen or touchpad (static pressure/static electricity), a jog wheel, a jog switch, a joystick and the like.

The image input units 115 and 128 process image frames such as still images or moving images obtained by an image sensor in an image call mode or a capturing mode. Then, the processed image frames are converted to image data that can be displayed on the display units 113 and 123 to be output to the display units 113 and 123. The image frames processed by the image input units 115 and 128 are stored in the memory 194, or are outwardly transmitted through the wireless communication module 191 under control of the controller 190.

The audio input unit 116 receives external audio signals by a microphone in a call mode, or a record mode, a voice recognition mode, and the like, and processes the signals into electric audio data. In the case of a call mode, the processed audio data is converted into data that can be transmitted to a base station through the wireless communication module 191, and thus is output to the wireless communication module 191. In the case of a record mode, the processed audio data is output to be stored in the memory 194. The audio input unit 116 may implement various algorithms to remove noise occurring when external audio signals are received.

The display units 113 and 123 display to output information processed in the portable terminal. For instance, in the case of a call mode, the display units 113 and 123 display a User Interface (UI) or a Graphic User Interface (GUI) relating to a call under control of the controller 190. In the case of a video call mode or a capturing mode, the display units 113 and 123 display output captured images, UI, or GUI under control of the controller 190. When the display unit 113 includes a touch screen, the display unit 113 may be used as an input device as well as an output device.

The audio output units 114 and 131 convert audio data received from the wireless communication module 191 in a call mode, a record mode, a voice recognition mode, a broadcasting reception mode, and the like, or convert audio data stored in the memory 194, under control of the controller 190, thereby outputting the converted data external to the portable terminal 100. The audio output units 114 and 131 may also output audio signals relating to functions performed in the portable terminal (e.g., a call signal receiving sound, a message receiving sound, etc.). The audio output units 114 and 131 may include a speaker, a receiver, a buzzer, and the like.

The sensing unit 196 senses the current state of the portable terminal such as an open/close state, a position of the portable terminal, or whether or not a user's is contacting the manipulation unit 124, thereby generating sensing signals to control operation of the portable terminal. Furthermore, the sensing unit 196 senses whether power was supplied from the power supply unit 126, whether the interface 125 was coupled to external devices, and the like.

The interface 125 allows interfacing with external devices connected to the portable terminal, such as a wire/wireless headset, an external charger, a wire/wireless data port, and a card socket (e.g., memory card, SIM/UIM, etc.). The interface 125 receives data or power from external devices thus to transmit to each component inside the portable terminal, or transmits data inside the portable terminal to the connected external devices.

The memory 194 may store programs for processing the controller 190, or may temporarily store input/output data (e.g., phonebook, messages, still images, moving images, and the like). The memory 194 may store programs for controlling operation of the portable terminal according to the present invention. The memory 194 may include a general hard disc, a card type memory (e.g., SD memory, or XD memory, etc.), a flash memory, RAM, ROM, and the like.

The broadcasting receiving module 195 receives broadcasting signals transmitted through satellite waves or terrestrial waves, and converts the broadcasting signals into broadcasting data that can be output to the audio output units 114 and 131, and the display units 113 and 123. Then, the broadcasting receiving module 195 outputs the converted data to the controller 190. The broadcasting receiving module 195 may receive additional data relating to broadcasting (e.g., Electric Program Guide (EPG), channel list, and the like). Broadcasting data and additional data converted by the broadcasting receiving module 195 may be stored in the memory 194.

The power supply unit 126 receives external or internal power under control of the controller 190, thereby supplying a necessary amount of power to each component.

According to the exemplary embodiment of the invention, the upper body is configured to move up and down with respect to the lower body, thereby minimizing a step occurring between the upper and lower bodies. In particular, the first moving unit is configured to vertically move the connection point up and down via a link member, thereby vertically moving the upper body in up and down directions with respect to the lower body in a simple manner. In addition, a cover is provided that can be moved with the upper body, thereby preventing the first moving unit from being exposed to outside in a closed configuration.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
    a lower body;
    an upper body connected to the lower body, the upper body being slidably moveable in a first direction with respect to the lower body between a closed position and an open position; and
    a first moving unit connected between the upper body and the lower body to move the upper body in a second direction different from the first direction, the first moving unit being configured to move the upper body toward the lower body along the second direction when the upper body is moved from the closed position to the open position and to move the upper body away from the lower body along the second direction when the upper body is moved from the open position to the closed position, the first moving unit including:
        a link member connecting the upper body to the lower body, the link member having a first end connected to the upper body at a first connecting point; and
        a linkage operator connected to the link member such that the first connecting point is moved toward the lower body when the upper body is moved from the closed position to the open position and the first connecting point is moved away from the lower body when the upper body is moved from the open position to the closed position,
    wherein the lower body further comprises a supporting frame configured to support the link member and the linkage operator, and
    wherein the supporting frame includes a first slot portion arranged perpendicular to the first direction, the first slot portion guiding the first connecting point toward and away from the lower body.

2. The portable terminal of claim 1, further comprising:
    a first display located at the upper body; and
    a second display located at the lower body,
    wherein at least one of the first and second displays is a touch screen for inputting information in a touch manner.

3. The portable terminal of claim 1, wherein the upper and lower bodies are configured so that their respective upper surfaces are disposed on the same plane when the upper body is moved into the open position.

4. The portable terminal of claim 1, wherein the linkage operator includes:
    a first operation member connected to the link member, the first operation member being configured to move the first connecting point by rotating the link member; and
    a second operation member pivotally connected to the first operation member, the second operation member being configured to move the first operation member during the sliding motion of the upper body.

5. The portable terminal of claim 4, wherein the upper body includes a push protrusion configured to move the second operation member by pushing the second operation member during the sliding motion of the upper body.

6. The portable terminal of claim 4, wherein the link member includes a second end connected to the first operation member at a second connecting point, the link member being pivotable about the second connecting point, and
    wherein the supporting frame includes a second slot portion extending from the first slot portion toward one side, the second slot portion being configured to guide the movement of the second connecting point.

7. The portable terminal of claim 6, wherein the second slot portion extends in a lateral direction of the lower body.

8. The portable terminal of claim 6, wherein the first slot portion extends perpendicular to the second slot portion.

9. The portable terminal of claim 4, wherein the second operation member is rotatably mounted on the supporting frame so as to cause the first operation member to be displaced in a straight line.

10. The portable terminal of claim 4, wherein a spring is connected between the supporting frame and the first operation member, the spring being configured to supply a restoration force to lift the upper body when the upper body is moved from the open position to the closed position.

11. The portable terminal of claim 1, further comprising a slide module located between the upper body and the first moving unit, the slide module slidably connecting the upper and lower bodies to each other.

12. The portable terminal of claim 11, wherein the slide module includes:
    an upper slide member connected to the upper body; and
    a lower slide member slidably connected to the upper slide member, the lower slide member being connected to the first moving unit.

13. The portable terminal of claim 12, wherein the slide module includes an elastic force supply unit configured to provide an elastic force to the upper and lower slide members when the slide member performs a sliding motion.

14. The portable terminal of claim 13, wherein the first moving unit includes a spring configured to provide a restoration force to lift the upper body when the upper body is moved between the open position and the closed position, and
    wherein the elastic force supply unit is configured to have an elastic force that is greater than the restoration force of the spring.

15. The portable terminal of claim 11, wherein the lower body includes a recess portion configured to receive the upper body as the upper body is moved from the closed position to the open position, and
    wherein the first moving unit is mounted on the recess portion.

16. The portable terminal of claim 15, further comprising a cover located at an outer periphery of the recess portion, the cover being configured to cover the first moving unit when the upper body is in the closed position.

17. The portable terminal of claim 16, wherein the cover is located on a lower surface of the lower slide member, the cover being inserted into the lower body when the upper body is lowered to the open position.

* * * * *